United States Patent
Cheng et al.

(10) Patent No.: US 12,428,344 B2
(45) Date of Patent: Sep. 30, 2025

(54) MAGNESIUM-BASED FLY ASH POROUS SOUND-ABSORBING MATERIAL WITH SURFACE HYDROPHOBICALLY MODIFIED AND PREPARATION METHOD THEREOF

(71) Applicant: Shanxi University, Taiyuan (CN)

(72) Inventors: Fangqin Cheng, Taiyuan (CN); Li Fang, Taiyuan (CN); Dongdong Zhou, Taiyuan (CN); Jiankuan He, Taiyuan (CN); Zhenzhen Jia, Taiyuan (CN)

(73) Assignee: Shanxi University, Taiyuan (CN)

( * ) Notice: Subject to any disclaimer, the term of this patent is extended or adjusted under 35 U.S.C. 154(b) by 354 days.

(21) Appl. No.: 18/202,973

(22) Filed: May 29, 2023

(65) Prior Publication Data

US 2023/0295047 A1    Sep. 21, 2023

Related U.S. Application Data

(63) Continuation of application No. PCT/CN2022/098361, filed on Jun. 13, 2022.

(30) Foreign Application Priority Data

Sep. 8, 2021 (CN) .......................... 202111050430.0

(51) Int. Cl.
   *C04B 28/30*    (2006.01)
   *C04B 41/00*    (2006.01)
   *C04B 41/49*    (2006.01)
   *C04B 41/64*    (2006.01)
   *C04B 111/27*   (2006.01)
   *C04B 111/52*   (2006.01)

(52) U.S. Cl.
   CPC ............ *C04B 28/30* (2013.01); *C04B 41/009* (2013.01); *C04B 41/4922* (2013.01); *C04B 41/64* (2013.01); *C04B 2111/27* (2013.01); *C04B 2111/52* (2013.01); *C04B 2201/20* (2013.01); *C04B 2201/50* (2013.01)

(58) Field of Classification Search
   CPC ... C04B 28/30; C04B 41/009; C04B 41/4922; C04B 41/64; C04B 2111/27; C04B 2111/52; C04B 2201/20; C04B 2201/50; C04B 2111/00413; C04B 38/106
   See application file for complete search history.

(56) References Cited

U.S. PATENT DOCUMENTS

2017/0283324 A1    10/2017    Cui

FOREIGN PATENT DOCUMENTS

| CN | 2480448 Y | * | 3/2002 |
|---|---|---|---|
| CN | 101244920 A | | 8/2008 |
| CN | 105503239 A | | 4/2016 |
| CN | 207062795 U | | 3/2018 |
| CN | 110255987 A | | 9/2019 |
| CN | 112661477 A | | 4/2021 |
| CN | 108529887 B | | 5/2021 |
| CN | 113698171 A | | 11/2021 |

OTHER PUBLICATIONS

Written Opinion for PCT/CN2022/098361. (Year: 2022).*
Zhou Dongdong, et al., Preparation and performance of base magnesium sulfate porous sound absorbing materials, CIESC Journal, 2021, pp. 3041-3052, vol. 72, No. 6.

* cited by examiner

Primary Examiner — Anthony J Green
(74) Attorney, Agent, or Firm — Bayramoglu Law Offices LLC

(57) ABSTRACT

A magnesium-based fly ash porous sound-absorbing material with a surface hydrophobically modified, and a preparation method thereof are provided. In the preparation method, a basic magnesium sulfate cement is adopted as a cementing agent and a fly ash is adopted as a mineral admixture to prepare a slurry; foaming is conducted through a physical foaming process in a foaming machine to obtain a foam; and the foam is mixed with the slurry, and a resulting mixture is poured and cured, and then subjected to a surface hydrophobic modification through vapor deposition to obtain the sound-absorbing material. The sound-absorbing material has a density of 251 kg/m$^3$ to 306 kg/m$^3$, a noise reduction coefficient (NRC) of 0.65 to 0.7, a compressive strength of 1.8 MPa to 2.2 MPa, and a water contact angle of 129° to 151°.

18 Claims, 2 Drawing Sheets

MAGNESIUM-BASED FLY ASH POROUS SOUND-ABSORBING MATERIAL WITH SURFACE HYDROPHOBICALLY MODIFIED AND PREPARATION METHOD THEREOF

CROSS REFERENCE TO THE RELATED APPLICATIONS

This application is a continuation application of International Application No. PCT/CN2022/098361, filed on Jun. 13, 2022, which is based upon and claims priority to Chinese Patent Application No. 202111050430.0, filed on Sep. 8, 2021, the entire contents of which are incorporated herein by reference.

TECHNICAL FIELD

The present disclosure relates to the field of sound absorption and noise reduction and specifically relates to a magnesium-based fly ash porous sound-absorbing material with a surface hydrophobically modified and a preparation method thereof.

BACKGROUND

In recent years, with the rapid development of industry and transportation, noise pollution has gradually intensified. Currently, common methods of noise control include: arrangement of noise barriers at both sides of a road, arrangement of a sound-absorbing material around a factory building, and the like. Unlike sound-insulating noise barriers, sound-absorbing noise barriers can absorb sound waves and improve sound environments at both inner and outer sides of a road. Inorganic non-metallic porous materials such as rock wool, porous ceramics, foam cement, and others are commonly used as unit board materials for sound-absorbing noise barriers due to their advantages such as excellent flame retardancy, weather resistance, and others. Although rock wool and porous ceramics have excellent sound absorption performance, the production process of rock wool causes heavy pollution and endangers the health of workers, and the use of rock wool also causes environmental pollution or the like; and the preparation process of porous ceramics has high energy consumption, high brittleness, and a relatively high cost. Although the traditional foam cement has a low cost, it is difficult to achieve both excellent mechanical performance and excellent sound absorption performance. Therefore, it is urgent to develop a low-cost and eco-friendly sound-absorbing material with light weight, high strength, excellent sound absorption performance, and excellent weather resistance.

Patent CN207062795U discloses a cement-based sound-absorbing material, where sound-absorbing holes are formed at a side of a material body to increase a direct contact area between a porous absorption structure inside the material and sound waves, and an average sound absorption coefficient of the prepared porous sound-absorbing material is increased by 6% to 30%. Although the arrangement of the sound-absorbing holes facilitates the improvement of sound absorption performance, the mechanical strength of the material will be inevitably affected. Patent CN110255987A discloses a cement-based foam sound-absorbing material, where foaming is conducted with an anionic surfactant and then natural air-drying is conducted to produce enough pores, and an average sound absorption coefficient is increased by 10% to 30%. However, the natural air-drying may lead to incomplete hydration of the material due to rapid surface water loss, thereby causing surface pulverization. Patent CN108529887B discloses a method for preparing a high-strength porous sound-absorbing material with a blast-furnace slow-cooled high-titanium slag as a main raw material. However, an average sound absorption coefficient of the prepared material is only 0.28 to 0.49. Zhou Dongdong et al. (Study on Controllable Preparation and Performance of Basic Magnesium Sulfate Porous Sound-absorbing Material [J]. CIESC Journal, 2021, 72 (6): 3041-3052) uses a basic magnesium sulfate cementing material as a matrix material, tetradecyl betaine as an air entraining agent, and a fly ash as a mineral admixture to prepare a porous sound-absorbing material with a density of 370 kg/m$^3$ to 430 kg/m$^3$ and a noise reduction coefficient (NRC) of 0.5 to 0.6. However, in this method, mechanical stirring is adopted for foaming, such that a foaming capacity is low and it is difficult to obtain a material with low density (less than 300 kg/m$^3$) and excellent sound absorption performance.

In view of this, the present disclosure provides a magnesium-based fly ash porous sound-absorbing material with a surface hydrophobically modified, and a preparation method thereof. The sound-absorbing material is a novel porous sound-absorbing material with a hydrophobic surface, light weight, high strength, and excellent sound absorption performance prepared as follows: a basic magnesium sulfate cement is adopted as a cementing agent and a fly ash is adopted as a mineral admixture to prepare a slurry, foaming is conducted through a physical foaming process in a foaming machine to obtain a foam, and the foam is mixed with the slurry, and a resulting mixture is poured and cured, and then subjected to surface hydrophobic modification through vapor deposition.

SUMMARY

An objective of the present disclosure is to provide a magnesium-based fly ash porous sound-absorbing material with a surface hydrophobically modified and a preparation method thereof. The sound-absorbing material mainly includes through holes with villiform inner walls, exhibits excellent sound absorption performance, and has the characteristics of light weight, high strength, surface hydrophobicity, and prominent weather resistance.

To achieve the above objective, the present disclosure adopts the following technical solutions:

A preparation method of a magnesium-based fly ash porous sound-absorbing material with a surface hydrophobically modified is provided, including the following steps:

step 1: thoroughly mixing magnesium oxide, a fly ash, and a fiber to obtain a mixed dry material;

step 2: dissolving magnesium sulfate heptahydrate and an admixture in water and heating for dissolution to obtain an admixture-containing magnesium sulfate solution;

step 3: adding the mixed dry material obtained in step 1 to the admixture-containing magnesium sulfate solution obtained in step 2 and stirring to obtain a cement slurry;

step 4: diluting a foaming agent with water, using a foaming machine to prepare a foam, and adding the foam to the cement slurry obtained in step 3 under low-speed stirring to obtain a foamed slurry;

step 5: pouring the foamed slurry obtained in step 4 into a mold, covering with a layer of plastic wrap, curing in air at room temperature for 1 d, demolding, and further curing until a test age to obtain a magnesium-based fly ash porous material;

step 6: adding a modifier dropwise around the magnesium-based fly ash porous material obtained in step 5, sealing, and conducting a surface deposition modification at a constant temperature to obtain a modified material; and step 7: fully cooling the modified material obtained in step 6 at room temperature, and taking the modified material out to obtain the magnesium-based fly ash porous sound-absorbing material with a surface hydrophobically modified.

Further, in step 1, the magnesium oxide is light burned magnesia (LBM) in which a content of active magnesium oxide is 55 wt % to 70 wt %. A too-high content of the active magnesium oxide will make the coagulation of the slurry too fast, resulting in poor fluidity during the pouring; and a too-low content of the active magnesium oxide will make the coagulation of the slurry too slow and make a stability time of the foam not match a coagulation time of the slurry, resulting in mold collapse.

A mass of the fly ash is 10% to 30% of a total mass of the mixed dry material. The fly ash is adopted as a mineral admixture, which can reduce the material cost. However, in a basic magnesium sulfate weak-alkaline system, a pozzolanic activity of the fly ash can hardly be stimulated, and thus the fly ash can only play a microaggregate role. A too-high content of the fly ash may reduce the reactant concentration, increase the reactant diffusion resistance, and decrease the mechanical performance.

A mass of the fiber is 0.3% to 0.8% of the total mass of the mixed dry material. The addition of an appropriate amount of the fiber can play the roles of load transfer, crack deflection, and pull-out effect, thereby improving the mechanical performance of the material. However, the addition of an excessive amount of the fiber not only increases a cost, but also is easy to cause fiber agglomeration.

Further, in step 1, the fiber is any one selected from the group consisting of a polyethylene (PE) fiber, a polypropylene (PP) fiber, a polyvinyl alcohol (PVA) fiber, a polyester fiber, and a polyamide (PA) fiber.

Further, in step 2, a molar ratio of magnesium sulfate in the magnesium sulfate heptahydrate to the active magnesium oxide is 1:5; and a mass of the admixture is 0.5% to 1% of a mass of the active magnesium oxide. The raw material ratios each are determined according to a theoretical value of a hydration reaction metering equation.

The admixture is any one selected from the group consisting of citric acid, a citrate, tartaric acid, a tartrate, phosphoric acid, and a phosphate. An anion of the admixture can form a complex with hydrated magnesium oxide to delay a hydration reaction and hinder the generation of a magnesium hydroxide precipitate. However, a too-high content of the admixture will lead to too long coagulation time, thereby affecting the construction efficiency.

The heating is conducted at 30° C. to 50° C. for dissolution, where an appropriate temperature can accelerate the dissolution of magnesium sulfate and improve the construction efficiency.

Further, in step 3, the cement slurry has a water-to-cement ratio of 0.6 to 0.8 and the water-to-cement ratio has a great impact on the mechanical performance and working performance of the material. A too-large water-to-cement ratio will lead to slow coagulation of the material and affect the construction efficiency; and a too-small water-to-cement ratio will deteriorate the working performance of the slurry.

Further, in step 3, the stirring is conducted at 600 r/min to 800 r/min for 8 min to 10 min. A too-short stirring time and a too-low rotational speed will lead to non-thorough mixing, thereby affecting the mechanical performance of the material. A too-long stirring time and a too-high rotational speed will accelerate the coagulation of the slurry, thereby deteriorating the working performance. If the foam has a too-large density, the foaming performance of the material will be reduced and the water-to-cement ratio will be increased. Too-fast stirring will destroy the stability of the foam, and too-slow stirring will make it difficult to thoroughly mix the foam with the slurry.

Further, in step 4, the foaming agent is diluted 50 to 80 times with the water; the foaming agent is obtained by mixing one or more selected from the group consisting of tetradecyl dimethyl betaine, sodium dodecylbenzenesulfonate (SDBS), and sodium dodecyl sulfate (SDS) at any ratio; the foam has a density of 30 kg/m$^3$ to 60 kg/m$^3$; and the low-speed stirring is conducted at 200 r/min to 400 r/min; in the vapor deposition, a vapor of the modifier is attached to a surface and a surface pore structure of the material through physical adsorption and capillary condensation on the surface of the porous material, which consumes only a very small amount of the modifier. The excessive modifier not only will cause a raw material waste and a cost increase, but also may cause pore blockage and reduce the sound absorption performance.

Further, in step 6, the modifier is any one selected from the group consisting of triethoxymethylsilane, isobutyltriethoxysilane, γ-aminopropyltriethoxysilane, poly(methyl 3,3,3-trioxopropyl)siloxane, and 1H,1H,2H,2H-perfluorodecyltriethoxysilane (PFDTES); and the modifier is added dropwise at an amount of 1 mL to 10 mL per 1 m$^2$ of the magnesium-based fly ash porous material.

Further, in step 6, the constant temperature means 55° C. to 70° C. for 2 h to 6 h. If the temperature is too high, the stability of the porous material will be affected; and if the temperature is too low, the modifier will evaporate slowly and a deposited amount is small, resulting in poor hydrophobicity.

A magnesium-based fly ash porous sound-absorbing material with a surface hydrophobically modified prepared by the preparation method is provided, where the magnesium-based fly ash porous sound-absorbing material with a surface hydrophobically modified has a density of 251 kg/m$^3$ to 306 kg/m$^3$, an NRC of 0.65 to 0.7, a compressive strength of 1.8 MPa to 2.2 MPa, and a water contact angle of 129° to 151°.

Compared with the prior art, the present disclosure has the following advantages:

(1) In the present disclosure, a foaming machine is used to prepare a low-density foam, and then the low-density foam is mixed with a basic magnesium sulfate cement slurry for foaming to obtain a low-density magnesium-based fly ash porous material. In contrast, it is difficult to prepare a low-density foamed material through conventional chemical foaming or physical foaming achieved by adding a surfactant and stirring. In addition, because the fly ash can only play a microaggregate role in a basic magnesium sulfate cement weak-alkaline slurry, an inappropriate foaming manner will lead to a significant increase in density. In the present disclosure, the magnesium-based sound-absorbing material with a fly ash content of 30% can have a density as low as 250 kg/m$^3$ to 300 kg/m$^3$.

(2) The porous sound-absorbing material prepared by the present disclosure has uniform pore structures, large porosity with a higher proportion of open cells, and abundant pore channels, which facilitates sound waves to enter the material. In addition, a large number of 5.1.7 phase needle-like and rod-like crystals grow on the inner pore walls to form a villiform micro-nano rough surface, which significantly enhances the friction and viscosity between the pore walls and air, allows sound energy to be quickly converted into heat energy, and makes sound waves sharply attenuated, thereby achieving the purpose of efficient noise reduction.

(3) In the present disclosure, a low-temperature vapor deposition method is used to subject the prepared magnesium-based fly ash porous sound-absorbing material to a surface hydrophobic modification at a temperature not higher than 70° C., which has no impact on the chemical composition and the pore structure of the material. During the low-temperature vapor deposition, a vapor generated by evaporation of the modifier is uniformly deposited on a surface and a pore wall through physical adsorption and capillary condensation on the surface of the porous material, such that the surface exhibits excellent hydrophobicity. In addition, a thickness of the deposited modifier is controllable, and the amount of the modifier is small, which effectively reduces the raw material cost.

(4) When at a density of 250 kg/m$^3$, the magnesium-based fly ash porous sound-absorbing material with a surface hydrophobically modified prepared by the present disclosure has an NRC as high as 0.7, a compressive strength as high as 1.8 MPa, and a water contact angle as high as 151° C., can meet the requirements of efficient sound absorption and excellent mechanical performance and weather resistance, and can be widely used in tunnels, highways, railways, and other places or environments that require sound absorption and noise reduction. In addition, the porous sound-absorbing material has excellent formability, and can be processed into sound-absorbing panels of different shapes as needed.

(5) The magnesium-based fly ash porous sound-absorbing material with a surface hydrophobically modified prepared by the present disclosure involves a simple process, a low cost, and no dust pollution, is eco-friendly, and can be easily used in industrial production.

BRIEF DESCRIPTION OF THE DRAWINGS

FIG. 1A is for Comparative Example 1, FIG. 1B is for Comparative Example 2, FIG. 1C is for Example 1, FIG. 1D is for Example 2, FIG. 1E is for Example 3, and FIG. 1F is for Example 3.

DETAILED DESCRIPTION OF THE EMBODIMENTS

The technical solutions of the present disclosure will be further described below through specific examples. Those skilled in the art should understand that the specific examples only help understand the present disclosure and should not be regarded as specific limitations to the present disclosure.

Comparative Example 1

A preparation method of a basic magnesium sulfate cement porous sound-absorbing material with a surface hydrophobically modified was provided, including the following steps:

(1) 1,380 g of magnesium oxide with an active magnesium oxide content of 61 wt % and 982.6 g of magnesium sulfate heptahydrate were weighed, where a molar ratio of the active magnesium oxide to magnesium sulfate was 5:1, 6.19 g of a PP fiber and 8.44 g of citric acid were weighed, and the active magnesium oxide was thoroughly mixed with the fiber to obtain a mixed dry material.

(2) 792.4 g of water was weighed; and the magnesium sulfate heptahydrate, the citric acid, and the water were mixed and incubated in a water bath at 45° C. for dissolution to obtain a magnesium sulfate solution.

(3) The mixed dry material obtained in step (1) was added to the magnesium sulfate solution obtained in step (2), and a resulting mixture was thoroughly stirred to obtain a slurry.

(4) Tetradecyl dimethyl betaine was diluted according to 1:60 and then used for foaming in a foaming machine to obtain a foam with a density of 45 kg/m$^3$, and the foam was added to the slurry obtained in step (3) under stirring at a rotational speed of 300 r/min to obtain a foamed slurry.

(5) The foamed slurry was poured into a mold and wrapped by a film, cured in air at room temperature for 1 d, then demolded, and further cured until a test age to obtain a basic magnesium sulfate cement porous sound-absorbing material.

(6) The porous sound-absorbing material obtained in step (5) was placed in a Petri dish, then 0.2 mL of PFDTES was added dropwise around the material in the Petri dish, the Petri dish was sealed with a lid and then placed in a 55° C. incubator, and a surface deposition modification was conducted at the constant temperature for 2 h.

(7) After the constant-temperature modification, the Petri dish with the lid covered was taken out and cooled to room temperature to obtain the basic magnesium sulfate cement porous sound-absorbing material with a surface hydrophobically modified.

Figure 1A:
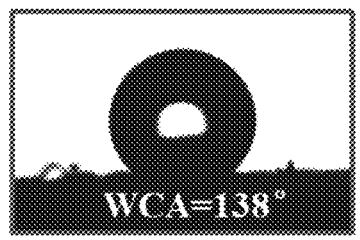
FIGS. 1A-1F show water contact angles of the materials prepared in Comparative Examples 1 and 2 and Examples 1, 2, 3, and 4, where

A water contact angle of the basic magnesium sulfate cement porous sound-absorbing material with a surface hydrophobically modified prepared in this comparative example was shown in FIG. 1A, and the mechanical and sound absorption performance indexes of the sound-absorbing material were shown in Table 1.

Comparative Example 2

A preparation method of a magnesium-based fly ash porous sound-absorbing material was provided, including the following steps:

(1) 1,530 g of magnesium oxide with an active magnesium oxide content of 55 wt % and 982.6 g of magnesium sulfate heptahydrate were weighed, where a molar ratio of the active magnesium oxide to magnesium sulfate was 5:1; 502.5 g of a fly ash, 12.6 g of a PVA fiber, and 8.44 g of citric acid were weighed; and the active magnesium oxide, the fly ash, and the fiber were thoroughly mixed to obtain a mixed dry material.

(2) 919.8 g of water was weighed and the magnesium sulfate heptahydrate, the citric acid, and the water were mixed and incubated in a water bath at 45° C. for dissolution to obtain a magnesium sulfate solution.

(3) The mixed dry material obtained in step (1) was added to the magnesium sulfate solution obtained in step (2), and a resulting mixture was thoroughly stirred to obtain a slurry.

(4) Tetradecyl dimethyl betaine was diluted according to 1:50 and then used for foaming in a foaming machine to obtain a foam with a density of 30 kg/m$^3$, and the foam was added to the slurry obtained in step (3) under stirring at a rotational speed of 200 r/min to obtain a foamed slurry.

(5) The foamed slurry was poured into a mold and wrapped by a film, cured in air at room temperature for 1 d, then demolded, and further cured until a test age to obtain the magnesium-based fly ash porous sound-absorbing material.

Figure 1B:

A water contact angle of the magnesium-based fly ash porous sound-absorbing material prepared in this comparative example was shown in FIG. 1B, and the mechanical and sound absorption performance indexes of the sound-absorbing material were shown in Table 1.

Example 1

A preparation method of a magnesium-based fly ash porous sound-absorbing material with a surface hydrophobically modified was provided, including the following steps:

(1) 1,530 g of magnesium oxide with an active magnesium oxide content of 55 wt % and 982.6 g of magnesium sulfate heptahydrate were weighed, where a molar ratio of the active magnesium oxide to magnesium sulfate was 5:1; 502.5 g of a fly ash, 12.6 g of a PVA fiber, and 8.44 g of citric acid were weighed; and the active magnesium oxide, the fly ash, and the fiber were thoroughly mixed to obtain a mixed dry material.

(2) 919.8 g of water was weighed; and the magnesium sulfate heptahydrate, the citric acid, and the water were mixed and incubated in a water bath at 45° C. for dissolution to obtain a magnesium sulfate solution.

(3) The mixed dry material obtained in step (1) was added to the magnesium sulfate solution obtained in step (2), and a resulting mixture was thoroughly stirred to obtain a slurry.

(4) Tetradecyl dimethyl betaine was diluted according to 1:50 and then used for foaming in a foaming machine to obtain a foam with a density of 30 kg/m$^3$, and the foam was added to the slurry obtained in step (3) under stirring at a rotational speed of 200 r/min to obtain a foamed slurry.

(5) The foamed slurry was poured into a mold and wrapped by a film, cured in air at room temperature for 1 d, then demolded, and further cured until a test age to obtain the magnesium-based fly ash porous sound-absorbing material.

(6) The magnesium-based fly ash porous sound-absorbing material obtained in step (5) was placed in a Petri dish, then 0.1 mL of triethoxymethylsilane was added dropwise around the material in the Petri dish, the Petri dish was sealed with a lid and then placed in a 70° C. incubator, and a surface deposition modification was conducted at the constant temperature for 3 h.

(7) After the constant-temperature modification, the Petri dish with the lid covered was taken out and cooled to room temperature to obtain the magnesium-based fly ash porous sound-absorbing material with a surface hydrophobically modified.

Figure 1C:
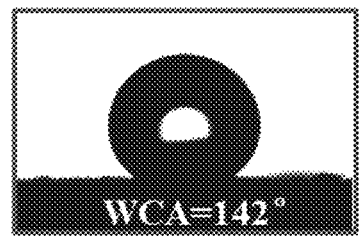

A water contact angle of the magnesium-based fly ash porous sound-absorbing material with a surface hydrophobically modified prepared in this example was shown in FIG. 1C, and the mechanical and sound absorption performance indexes of the sound-absorbing material were shown in Table 1.

Example 2

A preparation method of a magnesium-based fly ash porous sound-absorbing material with a surface hydrophobically modified was provided, including the following steps:

(1) 1,202 g of magnesium oxide with an active magnesium oxide content of 70 wt % and 982.6 g of magnesium sulfate heptahydrate were weighed, where a molar ratio of the active magnesium oxide to magnesium sulfate was 5:1; 720.8 g of a fly ash, 19.2 g of a PP fiber, and 8.44 g of citric acid were weighed; and the active magnesium oxide, the fly ash, and the fiber were thoroughly mixed to obtain a mixed dry material.

(2) 1418.8 g of water was weighed; and the magnesium sulfate heptahydrate, the citric acid, and the water were mixed and incubated in a water bath at 45° C. for dissolution to obtain a magnesium sulfate solution.

(3) The mixed dry material obtained in step (1) was added to the magnesium sulfate solution obtained in step (2), and a resulting mixture was thoroughly stirred to obtain a slurry.

(4) Tetradecyl dimethyl betaine was diluted according to 1:70 and then used for foaming in a foaming machine to obtain a foam with a density of 50 kg/m$^3$, and the foam was added to the slurry obtained in step (3) under stirring at a rotational speed of 400 r/min to obtain a foamed slurry.

(5) The foamed slurry was poured into a mold and wrapped by a film, cured in air at room temperature for 1 d, then demolded, and further cured until a test age to obtain the magnesium-based fly ash porous sound-absorbing material.

(6) The magnesium-based fly ash porous sound-absorbing material obtained in step (5) was placed in a Petri dish, then 0.15 mL of isobutyltriethoxysilane was added dropwise around the material in the Petri dish, the Petri dish was sealed with a lid and then placed in a 65° C. incubator, and a surface deposition modification was conducted at the constant temperature for 4 h.

(7) After the constant-temperature modification, the Petri dish with the lid covered was taken out and cooled to room temperature to obtain the magnesium-based fly ash porous sound-absorbing material with a surface hydrophobically modified.

Figure 1D:
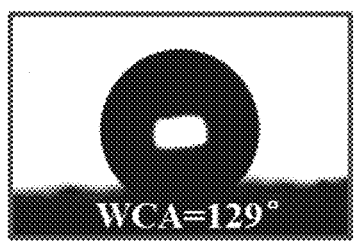
Figure 1E:
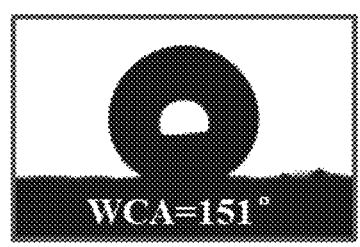

A water contact angle of the magnesium-based fly ash porous sound-absorbing material with a surface hydrophobically modified prepared in this example was shown in FIG. 1D, and the mechanical and sound absorption performance indexes of the sound-absorbing material were shown in Table 1.

Example 3

A preparation method of a magnesium-based fly ash porous sound-absorbing material with a surface hydrophobically modified was provided, including the following steps:

(1) 1,380 g of magnesium oxide with an active magnesium oxide content of 61 wt % and 982.6 g of magnesium sulfate heptahydrate were weighed, where a molar ratio of the active magnesium oxide to magnesium sulfate was 5:1; 796.8 g of a fly ash, 13.3 g of a PP fiber, and 8.44 g of citric acid were weighed; and the active magnesium oxide, the fly ash, and the fiber were thoroughly mixed to obtain a mixed dry material.

(2) 1,488.8 g of water was weighed; and the magnesium sulfate heptahydrate, the citric acid, and the water were mixed and incubated in a water bath at 45° C. for dissolution to obtain a magnesium sulfate solution.

(3) The mixed dry material obtained in step (1) was added to the magnesium sulfate solution obtained in step (2), and a resulting mixture was thoroughly stirred to obtain a slurry.

(4) Tetradecyl dimethyl betaine was diluted according to 1:80 and then used for foaming in a foaming machine to obtain a foam with a density of 60 kg/m³, and the foam was added to the slurry obtained in step (3) under stirring at a rotational speed of 400 r/min to obtain a foamed slurry.

(5) The foamed slurry was poured into a mold and wrapped by a film, cured in air at room temperature for 1 d, then demolded, and further cured until a test age to obtain the magnesium-based fly ash porous sound-absorbing material.

(6) The magnesium-based fly ash porous sound-absorbing material obtained in step (5) was placed in a Petri dish, then 0.1 mL of PFDTES was added dropwise around the material in the Petri dish, the Petri dish was sealed with a lid and then placed in a 65° C. incubator, and a surface deposition modification was conducted at the constant temperature for 3 h.

(7) After the constant-temperature modification, the Petri dish with the lid covered was taken out and cooled to room temperature to obtain the magnesium-based fly ash porous sound-absorbing material with a surface hydrophobically modified.

A water contact angle of the magnesium-based fly ash porous sound-absorbing material with a surface hydrophobically modified prepared in this example was shown in FIG. JE, and the mechanical and sound absorption performance indexes of the sound-absorbing material were shown in Table 1.

Example 4

A preparation method of a magnesium-based fly ash porous sound-absorbing material with a surface hydrophobically modified was provided, including the following steps:

(1) 1,530 g of magnesium oxide with an active magnesium oxide content of 55 wt % and 982.6 g of magnesium sulfate heptahydrate were weighed, where a molar ratio of the active magnesium oxide to magnesium sulfate was 5:1; 223.3 g of a fly ash, 8.9 g of a PVA fiber, and 8.44 g of citric acid were weighed; and the active magnesium oxide, the fly ash, and the fiber were thoroughly mixed to obtain a mixed dry material.

(2) 836.6 g of water was weighed; and the magnesium sulfate heptahydrate and the water were mixed and incubated in a water bath at 45° C. for dissolution to obtain a magnesium sulfate solution.

(3) The mixed dry material obtained in step (1) was added to the magnesium sulfate solution obtained in step (2), and a resulting mixture was thoroughly stirred to obtain a slurry.

(4) Tetradecyl dimethyl betaine was diluted according to 1:50 and then used for foaming in a foaming machine to obtain a foam with a density of 30 kg/m³, and the foam was added to the slurry obtained in step (3) under stirring at a rotational speed of 200 r/min to obtain a foamed slurry.

(5) The foamed slurry was poured into a mold and wrapped by a film, cured in air at room temperature for 1 d, then demolded, and further cured until a test age to obtain the magnesium-based fly ash porous sound-absorbing material.

(6) The magnesium-based fly ash porous sound-absorbing material obtained in step (5) was placed in a Petri dish, then 0.2 mL of triethoxymethylsilane was added dropwise around the material in the Petri dish, the Petri dish was sealed with a lid and then placed in a 60° C. incubator, and a surface deposition modification was conducted at the constant temperature for 4 h.

(7) After the constant-temperature modification, the Petri dish with the lid covered was taken out and cooled to room temperature to obtain the magnesium-based fly ash porous sound-absorbing material with a surface hydrophobically modified.

Figure 1F:
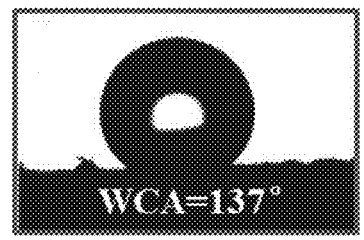

A water contact angle of the magnesium-based fly ash porous sound-absorbing material with a surface hydrophobically modified prepared in this example was shown in FIG. 1F, and the performance indexes of the sound-absorbing material were shown in Table 1.

TABLE 1

Performance of the magnesium-based fly ash porous sound-absorbing materials with a surface hydrophobically modified

| No. | Density (kg/m³) | Compressive strength (MPa) | NRC |
|---|---|---|---|
| Comparative Example 1 | 277 | 2.2 | 0.73 |
| Comparative Example 2 | 270 | 1.9 | 0.69 |
| Example 1 | 268 | 1.9 | 0.68 |
| Example 2 | 251 | 1.8 | 0.7 |
| Example 3 | 293 | 2 | 0.69 |
| Example 4 | 306 | 2. | 0.65 |

It can be seen from Table 1 that, when at a density of 251 kg/m³ to 306 kg/m³, the magnesium-based fly ash porous sound-absorbing materials with a surface hydrophobically modified prepared in Examples 1 to 4 have a compressive strength as high as 1.8 MPa to 2.2 MPa and exhibit mechanical performance far better than that of the existing Portland cement porous material and when a fly ash content is 30%, the NRC still can reach 0.65.

FIGS. 1A-1F show water contact angles of the materials prepared in Comparative Examples 1 and 2 and Examples 1 to 4. It can be seen from FIG. 1B that the unmodified sound-absorbing material has a water contact angle almost of 0° and is superhydrophilic, and a surface of each of the modified materials exhibits excellent hydrophobicity. In addition, it can be seen from FIG. 1A and FIG. 1E that, for the same PFDTES modifier, when the modification temperature is increased and the modification time is extended, the surface hydrophobicity of the material of the present disclosure is significantly enhanced, and the water contact angle can reach 151°, indicating superhydrophobicity.

Figure 2:
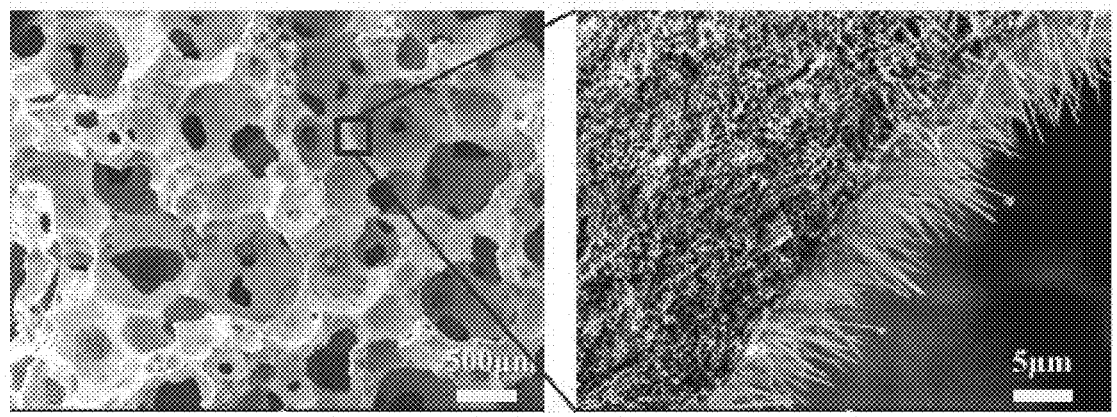
FIG. 2 shows a pore structure and a micro-morphology of the magnesium-based fly ash porous sound-absorbing material.

FIG. 2 shows a pore structure and a micro-morphology of the magnesium-based fly ash porous sound-absorbing material. It can be seen from the figure that the prepared material has abundant pore structures, and a large number of basic magnesium sulfate needle-like and rod-like crystals grow on an inner pore wall to form a villiform micro-nano rough surface.

The above implementations are only used to explain the present disclosure, not to limit the present disclosure. Without departing from the spirit and scope of the present disclosure, those of ordinary skill in the art can also make various changes and variations. Therefore, all equivalent technical solutions also belong to the scope of the present disclosure, and the patent protection scope of the present disclosure shall be defined by the claims.

The content not described in detail in the description of the present disclosure refers to existing technologies known by those skilled in the art. The illustrative specific implementations of the present disclosure are described above to facilitate those skilled in the art to understand the present disclosure, but it should be noted that the present disclosure is not limited to the scope of the specific implementations. Various obvious changes made by those of ordinary skill in the art within the spirit and scope of the present disclosure defined by the appended claims should fall within the protection scope of the present disclosure.

What is claimed is:

1. A preparation method of a magnesium-based fly ash porous sound-absorbing material with a surface hydrophobically modified, comprising the following steps:
   step 1: thoroughly mixing magnesium oxide, a fly ash, and a fiber to obtain a mixed dry material, wherein a mass of the fly ash is 10% to 30% of a total mass of the mixed dry material;
   step 2: dissolving magnesium sulfate heptahydrate and an admixture in water, and heating for dissolution to obtain an admixture-containing magnesium sulfate solution;
   step 3: adding the mixed dry material obtained in step 1 to the admixture-containing magnesium sulfate solution obtained in step 2, and stirring to obtain a cement slurry;
   step 4: diluting a foaming agent with water, using a foaming machine to prepare a foam, and adding the foam to the cement slurry obtained in step 3 under a low-speed stirring to obtain a foamed slurry, wherein the foaming agent is diluted 50 to 80 times with the water, and the foam has a density of 30 kg/m$^3$ to 60 kg/m$^3$;
   step 5: pouring the foamed slurry obtained in step 4 into a mold, covering with a layer of plastic wrap, curing in air at room temperature for 1 d, demolding, and further curing until a test age to obtain a magnesium-based fly ash porous material;
   step 6: adding a modifier dropwise around the magnesium-based fly ash porous material obtained in step 5, sealing, and conducting a surface deposition modification at a constant temperature to obtain a modified material, wherein the modifier is added dropwise at an amount of 1 mL to 10 mL per 1 m$^2$ of the magnesium-based fly ash porous material; and
   step 7: fully cooling the modified material obtained in step 6 at room temperature, and taking the modified material out to obtain the magnesium-based fly ash porous sound-absorbing material with a surface hydrophobically modified.

2. The preparation method according to claim 1, wherein in step 1, the magnesium oxide is light burned magnesia (LBM), wherein a content of active magnesium oxide is 55 wt % to 70 wt % in the LBM; and a mass of the fiber is 0.3% to 0.8% of the total mass of the mixed dry material.

3. The preparation method according to claim 1, wherein in step 1, the fiber is any one selected from the group consisting of a polyethylene (PE) fiber, a polypropylene (PP) fiber, a polyvinyl alcohol (PVA) fiber, a polyester fiber, and a polyamide (PA) fiber.

4. The preparation method according to claim 2, wherein in step 2, a molar ratio of magnesium sulfate in the magnesium sulfate heptahydrate to the active magnesium oxide is 1:5; a mass of the admixture is 0.5% to 1% of a mass of the active magnesium oxide; the admixture is any one selected from the group consisting of citric acid, a citrate, tartaric acid, a tartrate, phosphoric acid, and a phosphate; and the heating is conducted at 30° C. to 50° C. for dissolution.

5. The preparation method according to claim 1, wherein in step 3, the cement slurry has a water-to-cement ratio of 0.6 to 0.8.

6. The preparation method according to claim 1, wherein in step 3, the stirring is conducted at 600 r/min to 800 r/min for 8 min to 10 min.

7. The preparation method according to claim 1, wherein in step 4, the foaming agent is obtained by mixing at least one selected from the group consisting of tetradecyl dimethyl betaine, sodium dodecylbenzenesulfonate (SDBS), and sodium dodecyl sulfate (SDS) at any ratio; and the low-speed stirring is conducted at 200 r/min to 400 r/min.

8. The preparation method according to claim 1, wherein in step 6, the modifier is any one selected from the group consisting of triethoxymethylsilane, isobutyltriethoxysilane, γ-aminopropyltriethoxysilane, poly(methyl 3,3,3-trioxopropyl)siloxane, and 1H,1H,2H,2H-perfluorodecyltriethoxysilane (PFDTES).

9. The preparation method according to claim 1, wherein in step 6, the surface deposition modification is conducted at 55° C. to 70° C. for 2 h to 6 h.

10. A magnesium-based fly ash porous sound-absorbing material with a surface hydrophobically modified prepared by the preparation method according to claim 1, wherein the magnesium-based fly ash porous sound-absorbing material has a density of 251 kg/m$^3$ to 306 kg/m$^3$, a noise reduction coefficient (NRC) of 0.65 to 0.7, a compressive strength of 1.8 MPa to 2.2 MPa, and a water contact angle of 129° to 151°.

11. The magnesium-based fly ash porous sound-absorbing material according to claim 10, wherein in step 1 of the preparation method, the magnesium oxide is light burned magnesia (LBM), wherein a content of active magnesium oxide is 55 wt % to 70 wt % in the LBM; and a mass of the fiber is 0.3% to 0.8% of the total mass of the mixed dry material.

12. The magnesium-based fly ash porous sound-absorbing material according to claim 10, wherein in step 1 of the preparation method, the fiber is any one selected from the group consisting of a polyethylene (PE) fiber, a polypropylene (PP) fiber, a polyvinyl alcohol (PVA) fiber, a polyester fiber, and a polyamide (PA) fiber.

13. The magnesium-based fly ash porous sound-absorbing material according to claim 11, wherein in step 2 of the preparation method, a molar ratio of magnesium sulfate in the magnesium sulfate heptahydrate to the active magnesium oxide is 1:5; a mass of the admixture is 0.5% to 1% of a mass of the active magnesium oxide; the admixture is any one selected from the group consisting of citric acid, a citrate, tartaric acid, a tartrate, phosphoric acid, and a phosphate; and the heating is conducted at 30° C. to 50° C. for dissolution.

14. The magnesium-based fly ash porous sound-absorbing material according to claim 10, wherein in step 3 of the preparation method, the cement slurry has a water-to-cement ratio of 0.6 to 0.8.

15. The magnesium-based fly ash porous sound-absorbing material according to claim 10, wherein in step 3 of the preparation method, the stirring is conducted at 600 r/min to 800 r/min for 8 min to 10 min.

16. The magnesium-based fly ash porous sound-absorbing material according to claim 10, wherein in step 4 of the preparation method, the foaming agent is obtained by mixing at least one selected from the group consisting of tetradecyl dimethyl betaine, sodium dodecylbenzenesulfonate (SDBS), and sodium dodecyl sulfate (SDS) at any ratio; and the low-speed stirring is conducted at 200 r/min to 400 r/min.

17. The magnesium-based fly ash porous sound-absorbing material according to claim 10, wherein in step 6 of the preparation method, the modifier is any one selected from the group consisting of triethoxymethylsilane, isobutyltriethoxysilane, γ-aminopropyltriethoxysilane, poly(methyl 3,3,3-trioxopropyl)siloxane, and 1H,1H,2H,2H-perfluorodecyltriethoxysilane (PFDTES).

18. The magnesium-based fly ash porous sound-absorbing material according to claim 10, wherein in step 6 of the preparation method, the surface deposition modification is conducted at 55° C. to 70° C. for 2 h to 6 h.

* * * * *